May 31, 1927. 1,630,755
H. MILKER
TEMPERATURE CONTROL SYSTEM
Filed May 6, 1924 4 Sheets-Sheet 4
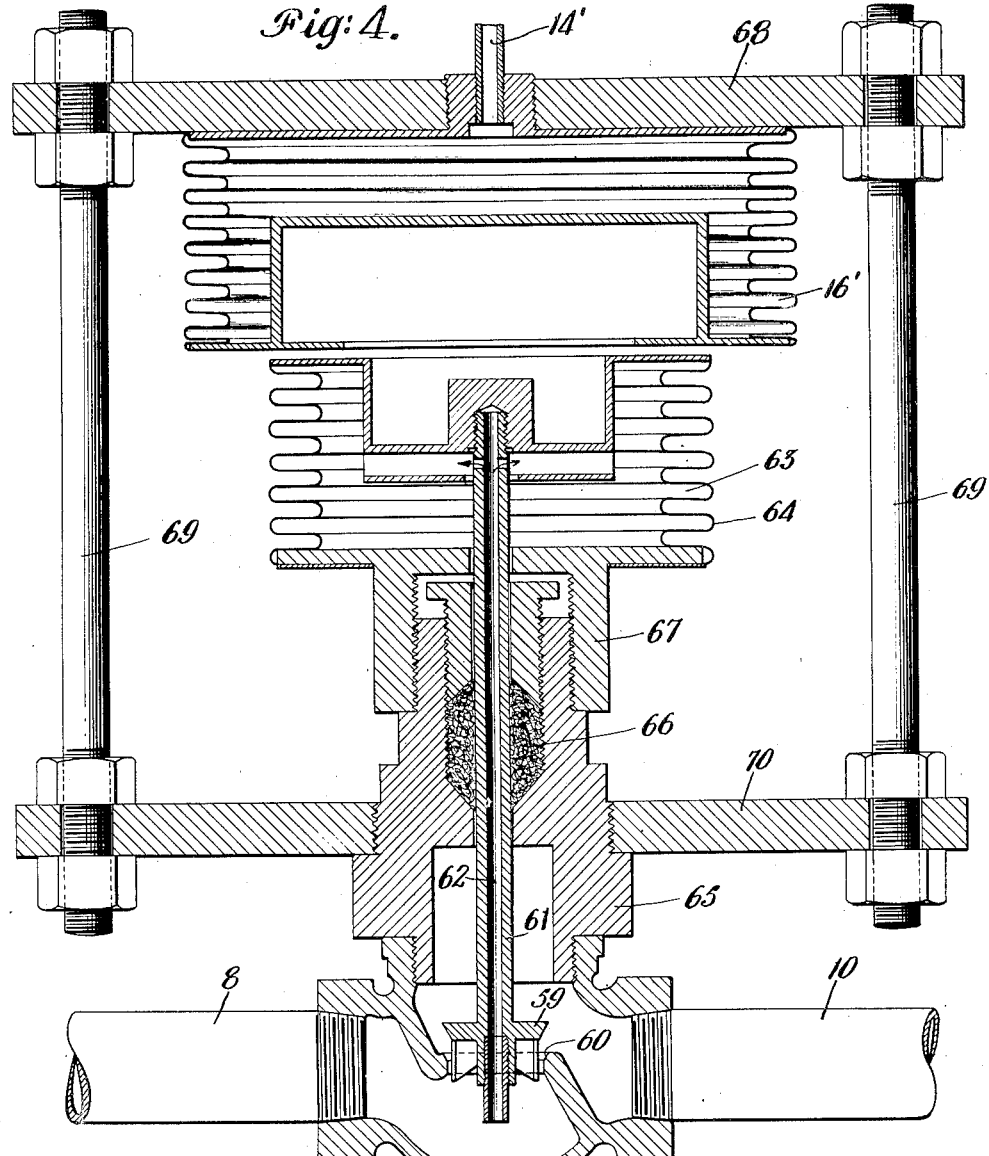
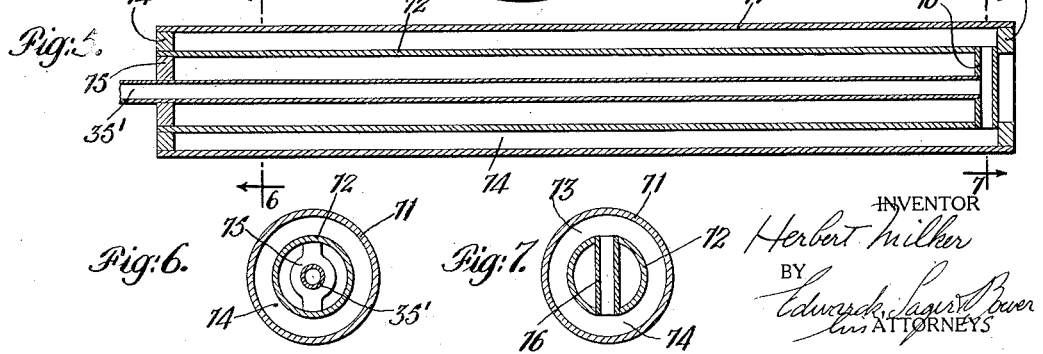
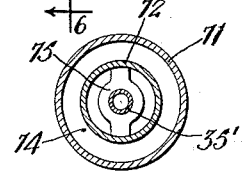
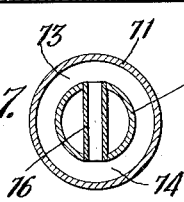
INVENTOR
Herbert Milker
BY
Edward Lagus Bower
ATTORNEYS Patented May 31, 1927.

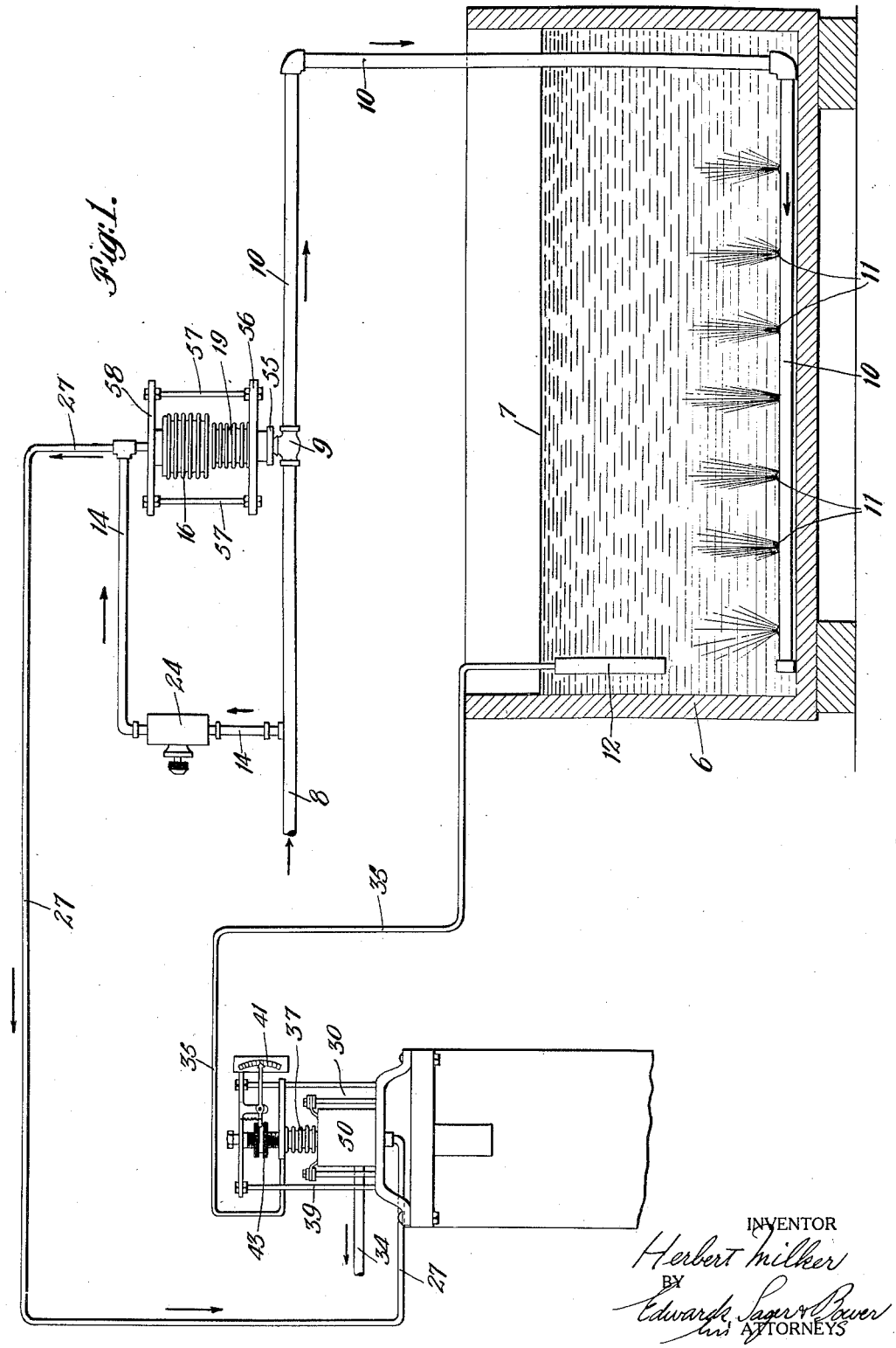

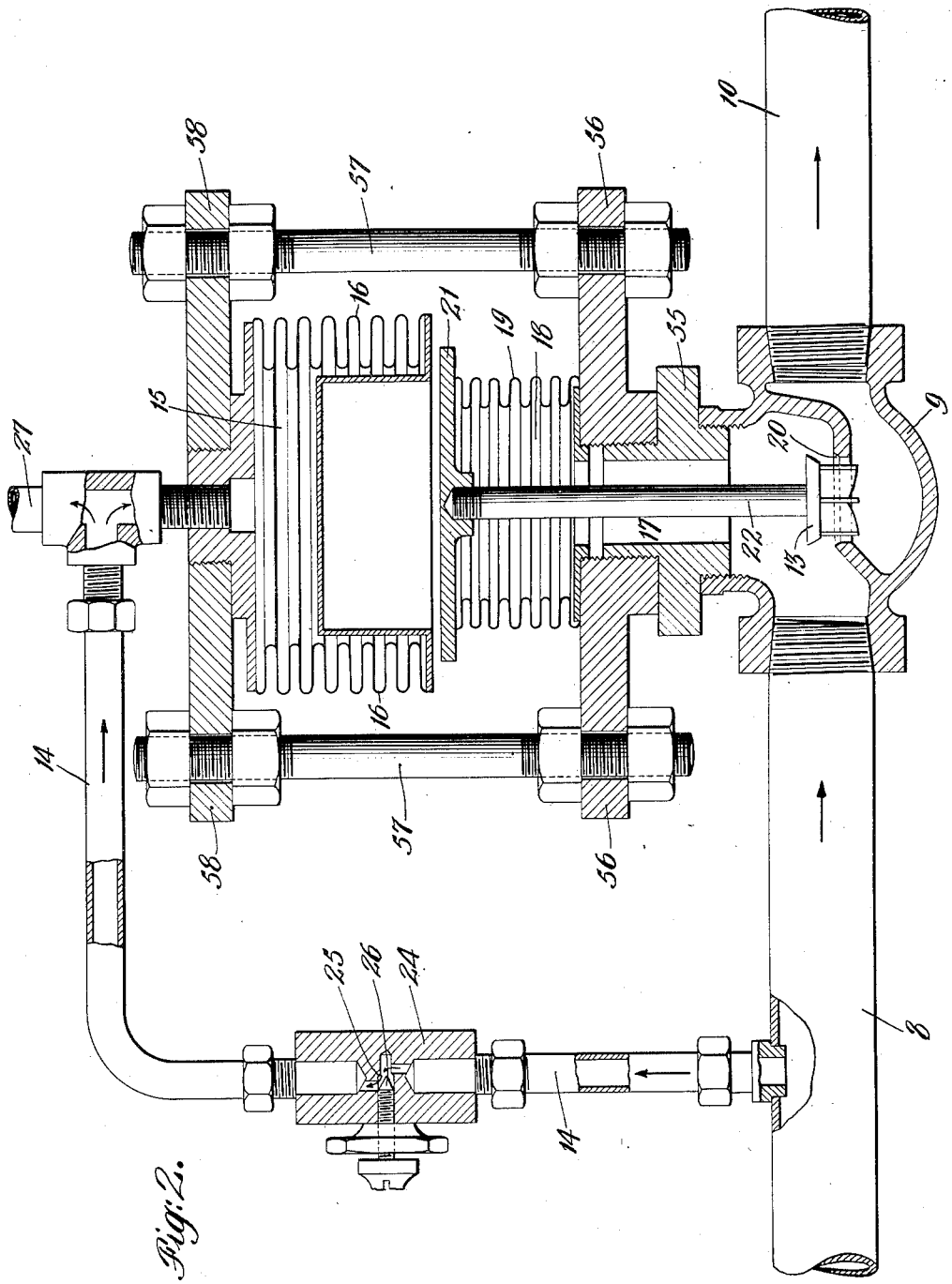

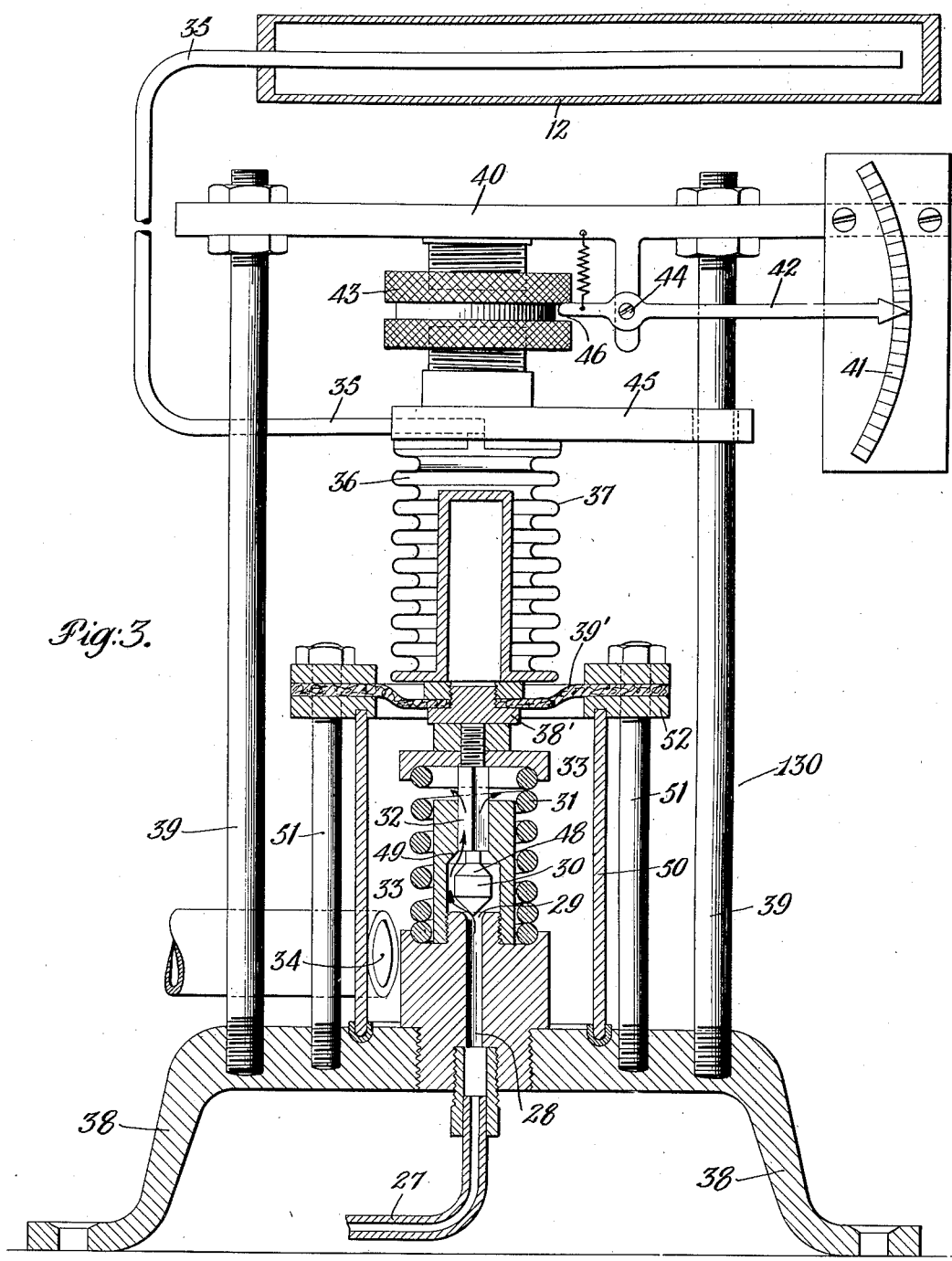

1,630,755

UNITED STATES PATENT OFFICE.

HERBERT MILKER, OF QUEENS, NEW YORK, ASSIGNOR TO AMERICAN SCHAEFFER & BUDENBERG CORPORATION, A CORPORATION OF NEW YORK.

TEMPERATURE-CONTROL SYSTEM.

Application filed May 6, 1924. Serial No. 711,351.

This invention relates to temperature regulators and particularly to regulators operating automatically to vary the supply of heat to maintain a desired temperature.

Prior regulators have been objectionable in requiring compressed air or water pressure as an auxiliary motive fluid for operating the valve controlling the heating fluid. Such auxiliary apparatus involves extra expense and is troublesome and difficult to maintain in operation. Oil, moisture and other impurities carried along with the air pressure cause air valve clogging difficulties and similarly the impurities in suspension or solution in a water pressure system give erratic and unreliable regulation.

The object of this invention is to overcome these objections by dispensing with the separate auxiliary motive fluid and to provide a system in which the heating medium itself, such as steam, operates the heat regulating valve. The resulting operation is accurate and reliable giving an exact control of the heat supply valve so that the system is thoroughly practical and is unlimited in its field of use.

In the accompanying drawings illustrating the invention—

Fig. 1 is a diagrammatic view of a control system showing one embodiment of the invention.

Fig. 2 is a vertical sectional view of a portion of the apparatus shown in Fig. 1.

Fig. 3 is a vertical sectional view of another portion of the apparatus shown in Fig. 1.

Fig. 4 is a vertical sectional view illustrating a modification of the apparatus shown in Fig. 2.

Fig. 5 is a sectional view showing a modified form of thermostatic bulb and

Figs. 6 and 7 are cross sectional views on the lines 6—6 and 7—7 of Fig. 5.

In the embodiment of the invention illustrated in the drawings a chamber, such for instance as the tank 6, containing a liquid 7, is to be heated by a steam supply from pipe 8, through regulating valve 9 and piping 10. The steam at 11 is shown as discharging into the liquid 7 but obviously the steam might be simply circulated through heating coils provided with a return to the source of heat.

Within the fluid being heated is placed a thermostatic bulb 12, and the changes of temperature of this bulb control the heat supply to the liquid to maintain a desired temperature of the fluid being heated.

In the system of this invention the movement of the valve 9 to regulate the supply in response to changes of temperature at the bulb 12 is effected by the steam supply itself. When there is a rise of temperature at the bulb 12 steam from the line 8 is used as the operating means of valve 9 to actuate the valve so as to decrease the supply of steam to the tank. Similarly a decrease in the temperature of the bulb 12 will cause an opening of the valve to increase the supply of steam. By proper setting of the regulating means a predetermined desired temperature may be maintained at the bulb 12.

To thus operate the regulating valve in response to changes in temperature the movable valve member 13 (Fig. 2) is moved by steam pressure from the supply line 8, which steam pressure is varied by the temperature fluctuations at the bulb 12. The steam for the operation of the valve member 13 is, in the specific embodiment shown taken from pipe 8 through the pipe 14 leading to a fluid pressure chamber 15 within the expanding-contracting bellows 16. Steam pressure in the chamber 15 expands the bellows downward to press the valve member 13 toward closed position. The valve member 13 is moved toward open position by steam pressure from the supply line 8, passing through the opening 17 to the chamber 18 of the expanding-contracting bellows 19 and expanding these bellows upward, as shown in Fig. 2, to lift the valve member 13 away from the seat 20.

In Fig. 2 the valve is shown in its full open position as at the beginning of the heating, when the steam pressure from line 8 expands bellows 19 and raises the disk 21 carrying valve stem 22 and valve member 13. As the temperature of the tank 6 rises the bulb 12 becomes heated and acts to increase the pressure within the upper bellows 16, which expands downward against the disk 21 and, due to its greater diameter, the bellows 16 compresses the bellows 19 and moves the valve member 13 toward closed position to decrease the flow of steam.

This control of the fluid pressure in the bellows 16 thus determines the position of the valve member 13 and regulates the steam supply. The pipe 14 supplying the operating pressure from the main 8 is provided with a reducing or restricting valve 24 comprising an opening 25 controlled in size by the adjustable needle valve 26, adapted to be set to any desired size of opening. Pressure passing through this restricting valve 24 will build up in the bellows 16 to close the main valve 13 unless this pressure is relieved through the by-pass pipe 27 leading to the temperature controlled pilot valve mechanism designated generally by the reference numeral 130 and shown in detail in Fig. 3.

In this pilot valve mechanism (Fig. 3) the bypass 27 leads through the passage 28 to the valve opening 29 controlled by the pilot valve 30. In the usual starting or cool condition of the apparatus the valve 30 is held open by spring 31 so that the steam is free to escape upward around the valve stem 32, which is triangular in section, and through the surrounding chamber 33 into the discharge pipe or outlet 34 which may waste the discharge. With the bypass 27 thus discharging freely through the pilot valve pressure will not build up in the bellows 16 and the regulating valve 9 will remain open. As the bulb 12 becomes heated it moves the pilot valve 30 toward its seat 29, this being accomplished by expansion of the fluid, ether for instance, which is hermetically sealed in the bulb 12 and connecting tube 35 and chamber 36 in bellows 37. The expansion of the thermostatic fluid will expand the bellows downward to press the stud 38' of the diaphragm 39' against the end of the pilot valve stem compressing the spring 31 and moving the pilot valve 30 downward to eventually bring the valve 30 so close to its seat 29 that this pilot valve opening is less than the opening between the valve seat 25 and needle 26 of the restricting valve 24. Then steam pressure will be built up within the bellows 16 and said steam pressure gradually increases through the continued expansion of bellows 37 and the consequent restriction of pilot valve 30. As the heating of bulb 12 continues this closing off of the flow through the pilot relief valve and the resultant throttling of the steam supply through the regulating valve will also continue until the temperature at the bulb 12 ceases to increase and is exactly the temperature to hold the pilot valve 30 and regulating valve 13 in position to supply just enough steam to maintain said temperature constant. Any disturbance of this equilibrium will be followed by an automatic readjustment of the apparatus tending to restore it.

If the temperature of the liquid 7 shows a tendency to drop, the lesser amount of heat then transmitted to bulb 12 causes a reduction in pressure within the thermostat system, the thermostatic bellows 37 contracts, the opening of the pilot valve 30 increases through the counter action of spring 31, more steam then escapes through the outlet 34, so that less pressure is maintained within the larger steam bellows 16 and, as a result, the smaller steam bellows 19 then expands to a greater extent to admit more steam through the valve 9 and increases the flow of heating fluid to the tank. On the other hand as soon as a slight tendency toward a higher temperature is felt on the bulb 12, the resultant slightly greater expansion of the thermostatic bellows 37 caused the pilot valve 30 to allow less steam to pass at that point, thus building up more steam pressure within the larger bellows 16 and compressing the smaller bellows 19 enough to cause the regulating valve 9 to pass the lesser amount of steam needed at the tank.

To permit the automatic regulator to be set for any desired predetermined temperature the thermostatic bellows 37 is supported from the base 38 by means of the rods 39, cross pieces 40 and the screw coupling 43 forming an adjustable support between the cross pieces 40 and the bellows 37. By revolving this coupling 43 one end of which is provided with a right hand thread while the other is provided with a left hand thread, the bellows 37 is moved vertically, being prevented from revolving by the arm 45 which engages one of the rods 39 as illustrated. Thus the bellows 37 will have to expand to a lesser or greater extent to operate the pilot valve 30 depending on the position to which the coupling 43 is moved. The setting of the pilot valve is thus indicated on the graduated scale 41 by the pointer 42 fulcruming at 44 and having its end projecting within the groove 46 of the coupling 43.

The pilot valve 30 with its seat 29 makes use of a variable leak or relief principle to allow an escape of any excess pressure beyond the exact amount needed to operate the regulating valve 9. This pilot valve is therefore not between the source of pressure supply and the point of application of the pressure. It is also not necessary that the pilot valve 30 close steam tight to enable an operative pressure to be built up within the steam bellows 16 sufficient to close tight shut the valve member 13.

When the bulb 12 is not heated, fluid contained within the thermostatic system 12, 35, 36 causes the bellows 37 to assume a form between a total collapse and fully expanded condition substantially as shown in Fig. 3 and, consequently, when in working order the expansion of the spring 31 is not able to push the pilot valve 30 upward above the position shown. The upper valve face 48 of the valve 30 is thus spaced away from the upper seat 49 a suitable distance to permit free passage of the escaping steam. However, if there is any injury of the bulb 12 or the connecting conduit 35 or anything causing a leakage of the fluid pressure within the thermostatic system, the expansion spring 31 will compress the bellows 37 and bring the valve face 48 against the valve seat 49 thereby shutting off the escape of steam or so restrict it at its exit as to build up sufficient pressure within the large bellows 16 to close the regulating valve 9 and shut off the supply of steam. The valve 48, 49 thus forms a safety device automatically shutting off the flow of the heating fluid in case the thermostatic system becomes inoperative. This prevents any injury which excessive heating might bring about if the failure of the thermostatic system is such as to otherwise cause the valve 9 to remain open or opened from the closed position.

In the form of apparatus as shown in the drawings no stuffing boxes are used in any part of the system. The flexible diaphragm 39′, formed of canvas rubber composition for instance, in conjunction with the cylinder 50 tightly sealed at each end by the clamping pressure of the bolts 51 and ring 52 affords a steam tight chamber for the pilot valve 30 without loss of movement due to the friction of a stuffing box. Similarly each of the bellows 16, 19 and 37 eliminates the friction loss of a stuffing box at its location and the bellows 19 also takes the place of a spring for definitely opening the regulating valve 9 and securing smooth operation. The bellows 19 is also effective in compensating for variation in the pressure of the steam supply on the line 8. Ordinarily and without the bellows 19 or its equivalent if the steam pressure supplied through pipe 8 varies, the same amount of opening of the valve 9 admits greater or less heat as the steam pressure is higher or lower and this calls upon the automatic regulator to follow up such changes and each time the regulator has to work against a different pressure condition in the line 8 which would indirectly alter the setting of the regulator. In the case of this invention, however, as the steam pressure in supply line 8 varies a corresponding lesser or greater pressure is supplied through the restricting valve 24 for operating the larger steam bellows 16 and the effect of this is compensated for by the lesser or greater resistance offered by the opposing steam bellows 19 so that the effect of the variation is negligible.

The inclusion of the restricting valve 24 permits the use of a minimum amount of steam for the operation of the valve 9, avoiding waste and minimizing the necessary movement of the pilot valve 30. Furthermore the restricting valve 24 may be so adjusted that enough steam is available for expanding the larger bellows 16 as promptly as required but still restricting the steam through the pipe 14 to such an amount that the smaller bellows 19 can also expand promptly when necessary, the pressure within the bellows 16 being quickly reduced by the opening of the pilot valve 30.

The particular form of apparatus shown in the drawings is simply by way of illustration of one means of arranging the elements of the system. In Figs. 1 and 2 the bellows 16 and 19 are shown as supported from the bonnet 55 of the casing of valve 9, a lower disk 56 with the bellows 19 being connected by bolts 57 to the upper supporting disk 58 for the bellows 16. It is obvious that any other means for supporting the bellows in position of the relation to each other and the valve 9 could be used.

In the form of the movable valve member 13 shown in Fig. 2 the steam passing through between the valve member and its seat 20 offers a diminishing resistance as the disk approaches closer to the seat 20 due to the drop in pressure below the disk. This tends to cause the valve 13 of Fig. 2 to open and close quickly. Instead of this disk form of valve a balanced valve of the piston type for instance, may be used or, as shown in Fig. 4, a form of valve may be used in which the flow is in a reverse direction between the valve disk and its seat so that the valve will offer an increasing resistance as it approaches its seat due to the drop in pressure above the disk. In this Fig. 4 form of valve the valve disk 59 is above its seat 60 and the valve stem 61 is hollow providing a passage 62 for the steam from the line 8 to the interior chamber 63 of the smaller bellows 64. The valve stem where it passes through the bonnet bushing 65 is surrounded by a stuffing box containing the packing material 66 sealing the parts against the escape of steam. The bellows 64 are supported by a screw thread flanged cap 67 screw threaded on to the upper end of the bushing 65. By this apparatus the steam pressure of the supply line 8 is continuously maintained within the bellows 64 so that these bellows expand upward. The upper larger bellows 16′ are supported from the disk 68 by rods 69 from the disk 70 supported by the bushing 65, steam being supplied to this upper bellows by a pipe 14′ as in Figs. 1 and 2.

For certain conditions it is desirable to use a bulb more sensitive to temperature changes than the structure shown at 12 in Fig. 3, without making the bulb extremely long. In such a case the bulb structure shown in Figs. 5, 6 and 7 may be used in which 71 represents an outer wall and 72 an inner wall of a bulb made up of two pieces of tubing, one within the other and joined at one end and closed by a suitably attached ring 73 while their other ends are joined and closed by ring 74. The conduit 35′ is supported by the bridge 75 within the open circulation space left within the inner wall 72. The end of the conduit 35' is joined to the branch 76, each end of which projects into the closed space within the outer and inner walls 71 and 72. This form of bulb exposes a thin layer of contained fluid for penetration of temperature changes both along the outer wall 71 and the inner wall 72 so that a very extensive exposure of the thermostatic fluid is attained in a comparatively short bulb.

The showing of the apparatus in the drawings is mainly diagrammatic in character, and it is obvious that various modifications and changes may be resorted to without departing from the principle of the invention, the steam containing passages and chambers may, of course, be enclosed or jacketed where desired and the various parts of the system will be arranged most suitably with relation to each other depending upon the special characteristics of each individual installation. While the disclosure shows a system in which a restricting valve 24 is interposed between the pressure source 8 and the pilot valve 30, it is obvious that the pressure in the bellows 16 may likewise be controlled by interchanging the relative positions of the restricting valve and thermostatically controlled pilot valve, and in such case it would probably be preferable to have the pilot valve open as the temperature increases so as to build up pressure in the bellows 16, said pressure being held by the small opening of the restricting valve. A lowering of the temperature will correspondingly close the pilot valve and the permanently open restricting and discharge valve will continue to discharge steam to reduce the fluid pressure in the bellows 16.

The invention is not confined to the specific embodiments shown and described but is intended to cover all modifications falling within the scope of the appended claims.

I claim:

1. In a temperature control system the combination with a part to be heated and means for supplying a heating fluid thereto, of means for regulating the supply of the heating fluid comprising a valve operated by the pressure of the heating fluid including differential pressure operated members both supplied with fluid pressure from the same side of said valve and working against atmospheric pressure.

2. In a temperature control system the combination with a part to be heated and means for supplying a heating fluid thereto, of means for regulating the supply of the heating fluid comprising a valve operated by the pressure of the heating fluid including differential pressure operated members both supplied with fluid pressure from the same side of said valve and working against atmospheric pressure, and a thermostatic control for said operating pressure.

3. In a temperature control system the combination with a part to be heated and means for supplying a heating fluid thereto, of means for regulating the supply of the heating fluid comprising a valve operated by the pressure of the heating fluid including differential pressure operated members both supplied with fluid pressure from the same side of said valve and working against atmospheric pressure, and a thermostatically actuated pilot valve controlling said operating pressure.

4. In a temperature control system the combination with a part to be heated and means for supplying a heating fluid thereto, of means for regulating the supply of the heating fluid comprising a valve, fluid pressure operated means for moving said valve including differential pressure operated members both supplied with fluid pressure from the same side of said valve and working against atmospheric pressure, and means for supplying said heating fluid to said operating means for said valve comprising a thermostatic control adapted to vary the operating pressure to control the position of said valve.

5. In a temperature control system the combination with a part to be heated and means for supplying a heating fluid thereto, of means for regulating the supply of the heating fluid comprising a valve, fluid pressure operated means for moving said valve comprising oppositely disposed pressure operated members disconnected from each other in the full open position of the valve, and means for supplying said heating fluid to said operating means for said valve comprising a flow restricting connection and a thermostatically controlled pilot valve adapted to vary the operating pressure to control the position of said main valve.

6. In a temperature control system the combination with a regulating valve for heating fluid, of means for operating said valve comprising a fluid pressure moved member connected to said valve and adapted to hold said valve open, and a second fluid pressure moved element normally disengaged from and out of contact with said first pressure moved element, and adapted to move thereagainst to close said valve.

7. In a temperature control system the combination with a regulating valve for heating fluid, of means for operating said valve comprising a fluid pressure moved member connected to said valve and adapted to hold said valve open, and a second fluid pressure moved element, normally disengaged from said first pressure moved element, and adapted to move thereagainst to close said valve, each of said elements being operated by the pressure of the heating fluid on the same side of said valve.

8. In a temperature control system, a main regulating valve and fluid pressure means for operating said valve comprising an automatic regulator having a thermostatic bulb, an expanding contracting member connected to said bulb, a diaphragm member engaged by said expanding contracting member, a pilot valve actuated by said diaphragm member for discharging fluid pressure, and means for supplying fluid pressure through a predetermined opening for operating said main valve.

9. In a temperature control system, a main valve for regulating the flow of a heating fluid, fluid pressure means for operating said main valve, a fixed opening for the supply of fluid pressure from the source of heating fluid, a pilot valve for varying said fluid pressure, and a thermostat means for controlling said pilot valve comprising an expansible contractible member, and a diaphragm member carrying said pilot valve and engaged by said expansible contractible member.

10. In a temperature control system, a main valve for regulating the supply of a heating fluid, fluid pressure means for operating said main valve, a fixed opening for a supply of fluid pressure from the source of heating fluid, thermostatically controlled means for regulating the operating pressure in said fluid pressure means comprising means for automatically causing the closure of the main valve when said thermostatically controlled means becomes inoperative in any position.

11. In a temperature control system, a main valve having fluid pressure operating means and a pilot valve for regulating the fluid pressure in said operating means, an expanding contracting member for actuating said pilot valve, and a flexible wall between said pilot valve and said expanding contracting member for separating said expanding contracting member from said fluid pressure.

12. In a regulating system having a main valve for regulating the supply of heating fluid and means for actuating said main valve by fluid pressure from a given source, a second fluid pressure operated means actuated from the same source of fluid pressure and adapted to oppose said first named operating means in accordance with pressure changes in said fluid pressure, each of said fluid pressure operated means having atmospheric pressure opposing the fluid pressure from the source of heating fluid.

13. In a regulating system having a main valve for regulating the supply of heating fluid and means for actuating said main valve by fluid pressure from the source of heating fluid, a second fluid pressure operated means actuated from the same source of fluid pressure and adapted to oppose said first named operating means in accordance with pressure changes in said fluid pressure, each of said fluid pressure operated means having atmospheric pressure opposing the fluid pressure from the source of heating fluid.

14. A regulating system including a main valve for regulating the supply of a fluid under pressure, fluid pressure means for actuating said main valve, a fixed opening for the supply of fluid pressure to said operating means from the same source as said fluid under pressure, a connection from said fluid under pressure to an expanding contracting member, and a pilot valve adapted to vary the fluid pressure in said operating means and control the position of said main valve, said main valve being automatically closed when said expanded contracted member becomes inoperative in any position.

15. In a temperature control system the combination with a part to be heated, of means for supplying a heating fluid thereto, a main valve for regulating the supply of heating fluid, fluid pressure operated means for operating said main valve, and means for supplying fluid pressure to said operating means comprising a connection to the source of heating fluid, a pilot valve for controlling the pressure in said fluid operating means for said main valve, temperature control means for operating said pilot valve and means for automatically causing a closure of the main valve upon failure of said temperature control in any position of the parts.

16. In a thermostatic control a thermometer bulb comprising a hollow cylindrical chamber having exterior and interior exposed walls, and a connecting pipe extending from end to end through the hollow portion of said bulb.

HERBERT MILKER.